B. MANCUSO.
PIPE SLEEVE.
APPLICATION FILED SEPT. 15, 1919.
1,350,615.
Patented Aug. 24, 1920.
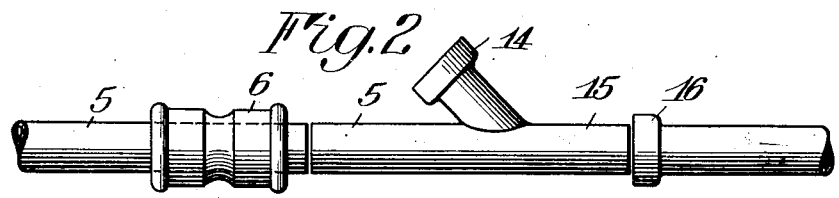
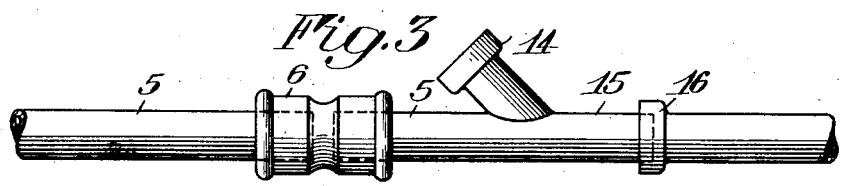
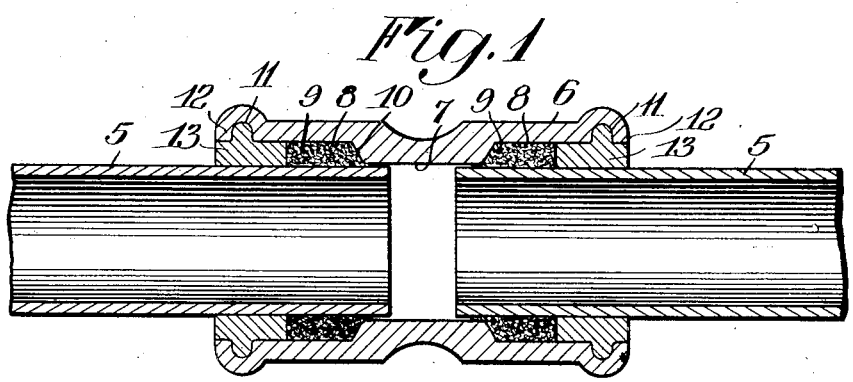
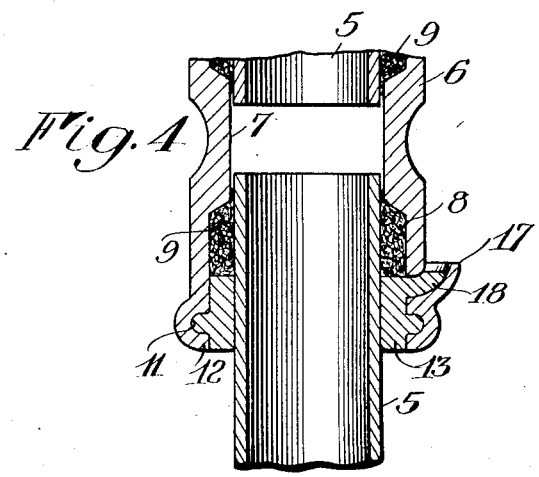
WITNESSES:
Edw H Cumpston
Nelson H. Copp
INVENTOR
Benjamin Mancuso
BY
his ATTORNEYS

UNITED STATES PATENT OFFICE.

BENJAMIN MANCUSO, OF BATAVIA, NEW YORK.

PIPE-SLEEVE.

1,350,615. Specification of Letters Patent. Patented Aug. 24, 1920.

Application filed September 15, 1919. Serial No. 323,769.

*To all whom it may concern:*

Be it known that I, BENJAMIN MANCUSO, of Batavia, in the county of Genesee and State of New York, have invented certain new and useful Improvements in Pipe-Sleeves; and I do hereby declare the following to be a full, clear, and exact description of the same, reference being had to the accompanying drawings, forming a part of this specification, and to the reference-numerals marked thereon.

This invention relates to pipe construction and more particularly to devices or sleeves used for connecting the adjoining ends of adjacent sections of a pipe line, the main object of the invention being the provision of a simple and economical sleeve which is convenient to adjust and secure in position and which insures an efficient, fluid tight connection. To these and other ends the invention consists in certain improvements and combinations of parts, all as will be hereinafter more fully described, the novel features being pointed out in the claims at the end of the specification.

In the drawings:

Figure 1 is a central longitudinal section showing the construction of the sleeve and parts associated therewith.

Fig. 2 is an exterior view showing the sleeve in conjunction with a pipe line during adjustment.

Fig. 3 is a similar view showing the parts in adjusted position.

Fig. 4 is a fragmentary sectional view similar to Fig. 1 but showing a modified construction of the sleeve.

Similar reference characters throughout the several views indicate the same parts.

The present embodiment of the invention, which is now preferred as best illustrating the principles involved, is shown in conjunction with a pair of pipe ends 5 (Figs. 1 and 4) of adjacent sections of a pipe line connected by a substantially cylindrical sleeve 6, the interior of which is provided preferably adjacent its center with an abutment or bearing portion 7 adapted to slidably and closely engage the pipe, thus forming a bearing for securely retaining the pipe ends in alinement with each other. At either end of abutment 7 the sleeve is formed with an enlarged portion 8 providing an annular chamber about the pipe adapted to receive any suitable packing material, such for example as oakum, the ends of the abutment being beveled as indicated at 10 to force the packing material into intimate engagement with the pipe when the material is compressed. This construction permits the packing to be fully compressed in the chamber 8 to insure a tight joint, while preventing the intrusion of the material into the pipe and consequent obstruction of the latter, even when the ends of the pipe are somewhat spaced from each other, as shown in Fig. 1, for a purpose hereinafter described.

Adjacent the end of the sleeve, each chamber 8 has formed in its wall a preferably annular recess 11, providing a shoulder 12 substantially in the plane of the wall of the chamber so as not to interfere with the insertion and compression of packing and cementing materials. After the packing material 9 is compressed in place, a cementing material of any suitable composition such, for example, as lead is poured into the end of chamber 8 filling the latter and recess 11. This material may be compressed to wedge it more securely into the recess 11 which secures it to the sleeve and anchors it in position so that it cannot be forced out of place by pressure of the fluid in the pipe. The cementing material, of course, holds the packing in compressed condition and securely attaches the sleeve to the pipe, the abutment 7 and packing and cementing materials affording a fluid-tight, rigid bearing for each pipe end and insuring a durable, satisfactory connection.

The invention is adapted for a wide range of uses in its class, and its construction makes it particularly convenient where a soil pipe line already laid is cut for the purpose of repair, or to insert a branch connection, in which case the work has to be done under the difficulties incident to operating in a constricted space, as for example at the bottom of a trench. Under such circumstances it is difficult to insert the new section of pipe in position in the pipe line if cut to the exact length of the space between the ends of the adjacent pipe sections. The present invention provides a construction which permits the sleeve to be slid onto an adjacent pipe section as illustrated in Fig. 2, the new section of pipe being cut a little short so that it may be inserted vertically and conveniently as shown in this figure and then moved longitudinally into proper engagement with the hub 16 of the adjacent pipe section, after which sleeve 6 is slid along the pipe over the joint to be connected, as shown in Fig. 3. The packing and cementing materials described above are then inserted to retain the sleeve in place and securely connect the pipe, the abutment 7 being of such length as to provide for the space left between the ends of the pipe sections.

Fig. 4 illustrates a modified form of construction in which sleeve 6 is provided preferably adjacent one end, with a receptacle 17 communicating at 18 with the space for the reception of the cementing material 13, the receptacle opening upwardly as shown in the drawing, its purpose being to provide a convenient means for pouring the cementing material into the bottom end of the sleeve when the latter is employed in a position inclined to the horizontal, an operation otherwise difficult and inconvenient.

The sleeve is simple and economical in form and affords an efficient connection for the pipe ends, supporting them securely in relative position and allowing the packing to be fully compressed without danger of the latter intruding into and obstructing the pipe, while the cementing material is securely retained in place against pressure exerted by the fluid in the pipe. The abutment or shoulder 7 reinforces the pipe ends and makes adequate provision for leaving a small gap between the latter in order to take advantage of the convenient method of manipulation or assembly of parts described above without impairing the efficiency of the connection. The provision of receptacle 17 for filling the lower end of the sleeve with cementing material in case the sleeve is disposed at an angle adds further to the general convenience of the invention.

I claim as my invention:

1. A sleeve for connecting pipe sections having interiorly thereof a portion for closely and slidably engaging adjacent pipe ends, an enlarged portion forming an annular chamber at either end of said pipe engaging portion for the reception of packing and cementing material, an annular shoulder at either end of the sleeve for retaining said cementing material in position, and an exterior receptacle communicating with one of said chambers for the introduction of cementing material thereto when the sleeve is inclined from a horizontal position with the latter chamber at its lower end.

2. A sleeve for connecting pipe sections having centrally disposed therein a bearing portion for the adjacent pipe ends, said sleeve adapted to be slipped back over one of the pipes to be connected and then slipped over the joint between the connected pipes, said sleeve having an enlarged end portion of substantially the same thickness of material throughout, and adapted to contain both packing and cementitious material, a shoulder portion on the enlarged end portion having a groove inside for retaining the cementitious material in position.

BENJAMIN MANCUSO.